Dec. 8, 1936.  M. WALLACE  2,063,534
AUTOMATIC PILOTING SYSTEM
Filed July 29, 1930  6 Sheets-Sheet 1
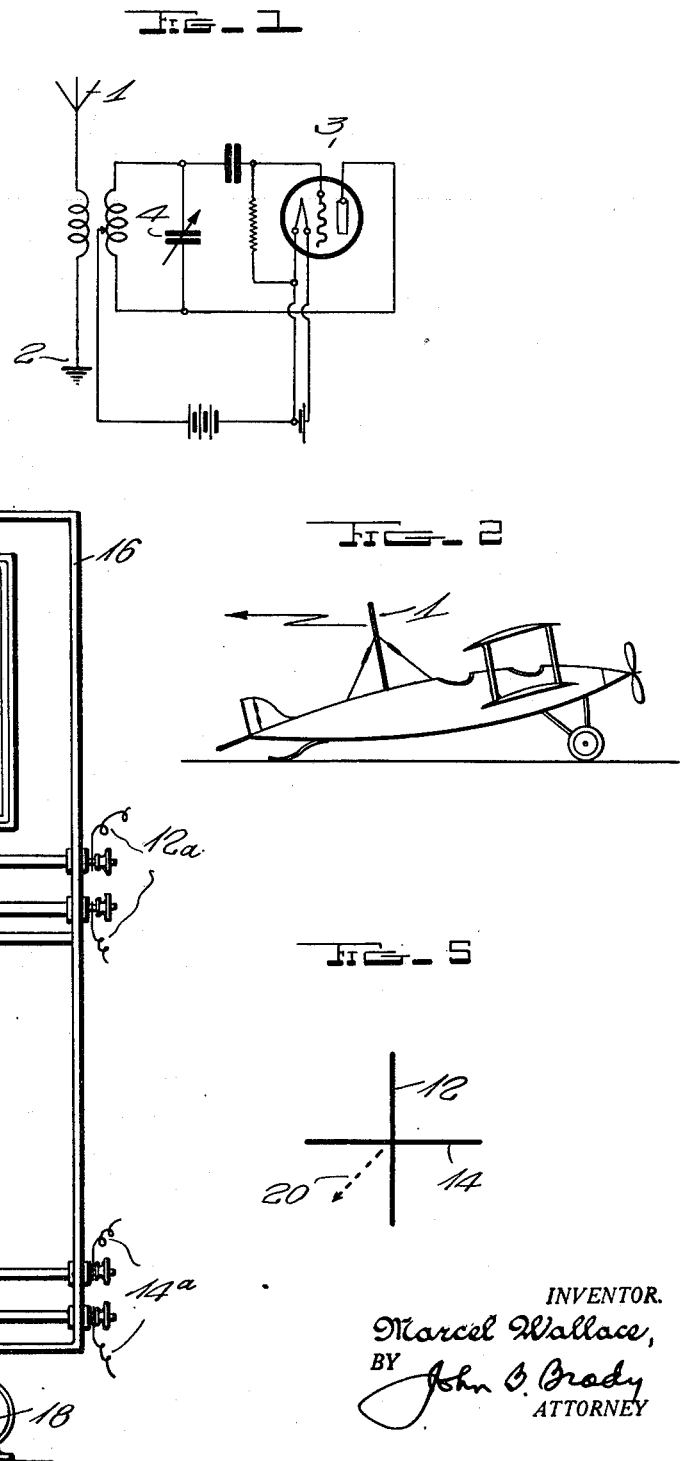
INVENTOR.
Marcel Wallace,
BY John O. Brody
ATTORNEY Dec. 8, 1936.  M. WALLACE  2,063,534
AUTOMATIC PILOTING SYSTEM
Filed July 29, 1930   6 Sheets-Sheet 2

INVENTOR.
Marcel Wallace,
BY John C. Brady
ATTORNEY.

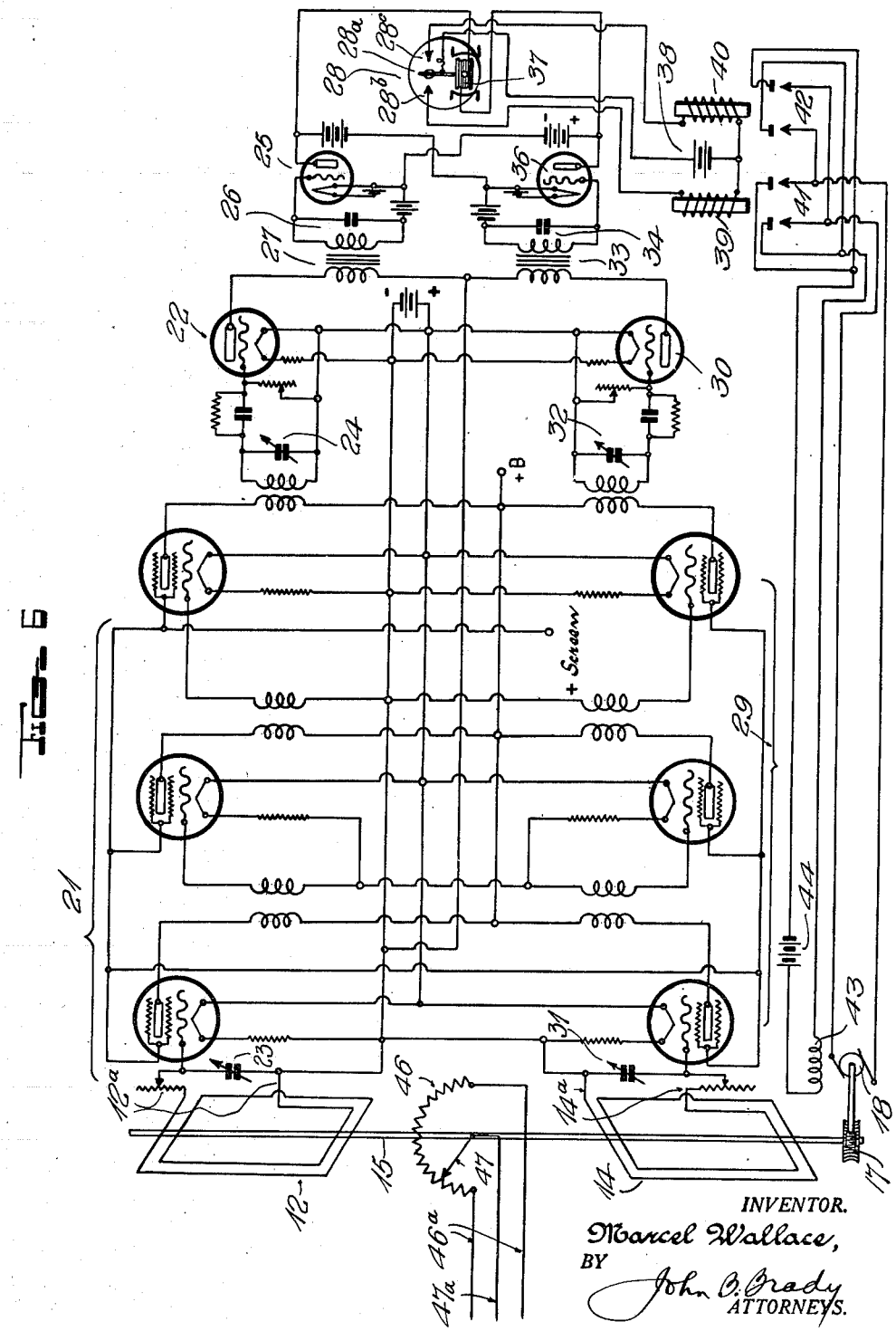

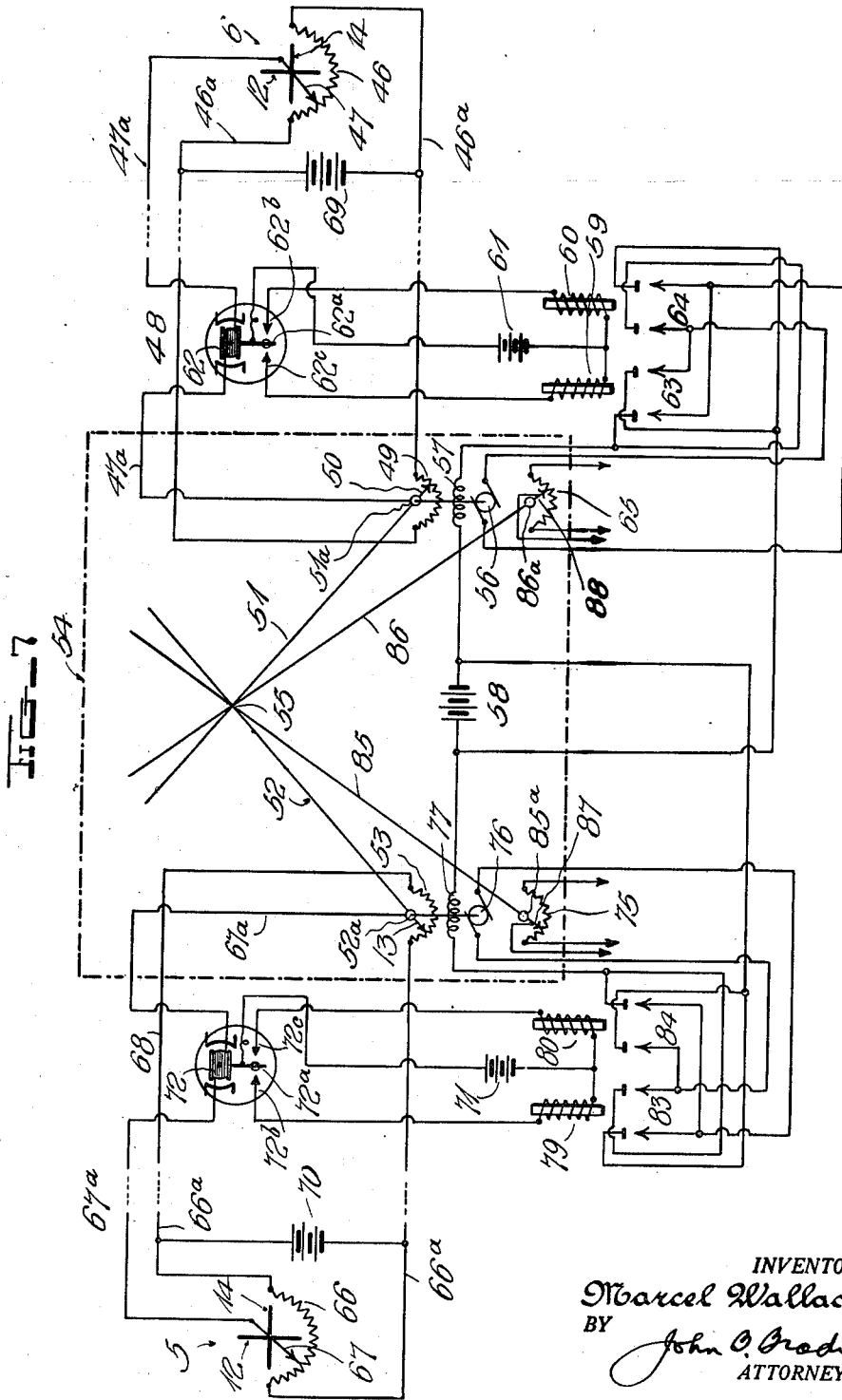

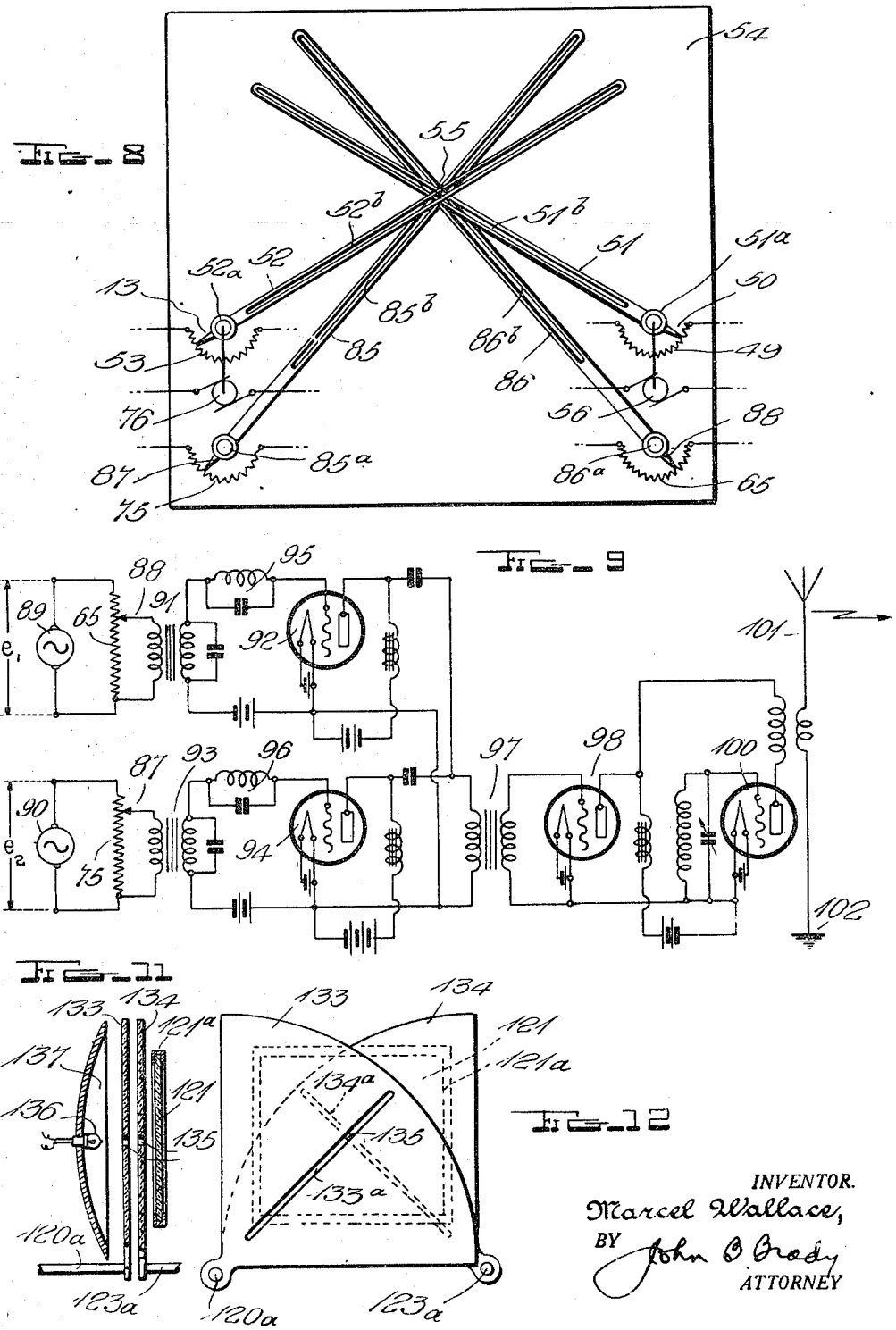

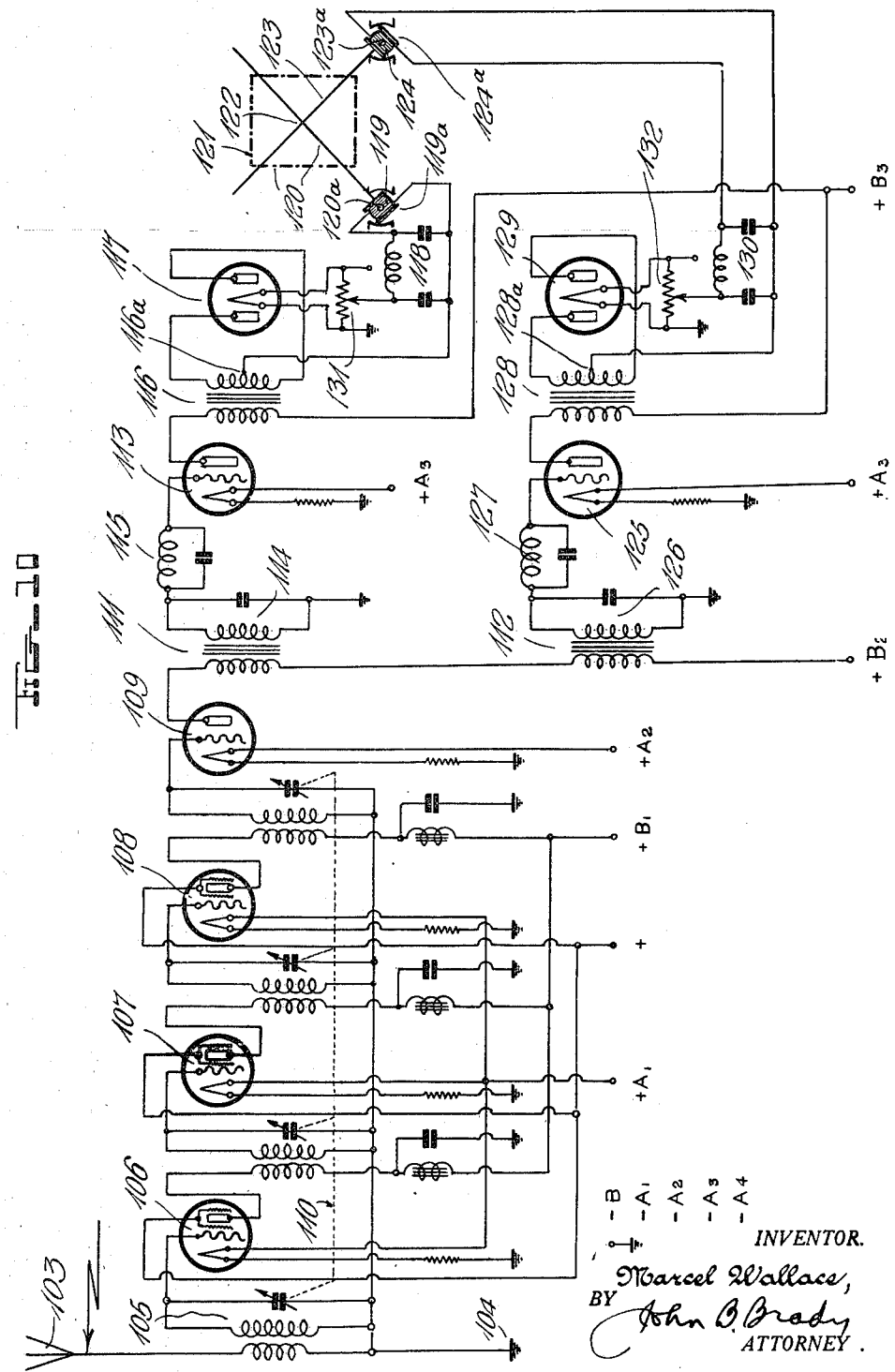

Patented Dec. 8, 1936

2,063,534

UNITED STATES PATENT OFFICE 2,063,534

AUTOMATIC PILOTING SYSTEM

Marcel Wallace, Staten Island, N. Y., assignor of one-third to Edward L. Corbett, New York, N. Y.

Application July 29, 1930, Serial No. 471,586

9 Claims. (Cl. 250—11)

My invention relates broadly to piloting systems and more particularly to a system for automatically indicating to the pilot of a navigable vessel the path of his approach to a port.

One of the objects of my invention is to provide automatic means for indicating to a pilot the course of travel to a definite point and automatically informing the pilot of the position of the navigable vessel with respect to the port.

Another object of my invention is to provide automatic means which may be located at a port and automatic means which may be carried aboard a navigable vessel and automatically cooperative for indicating to the pilot on the navigable vessel the position of the vessel with respect to the port for aiding the pilot in bringing the vessel to port.

Still another object of my invention is to provide a method of navigating a vessel with respect to a particular port where means are provided for informing the pilot at all times as to the position of the vessel with respect to the port which is the destination of the vessel.

Figure 3:
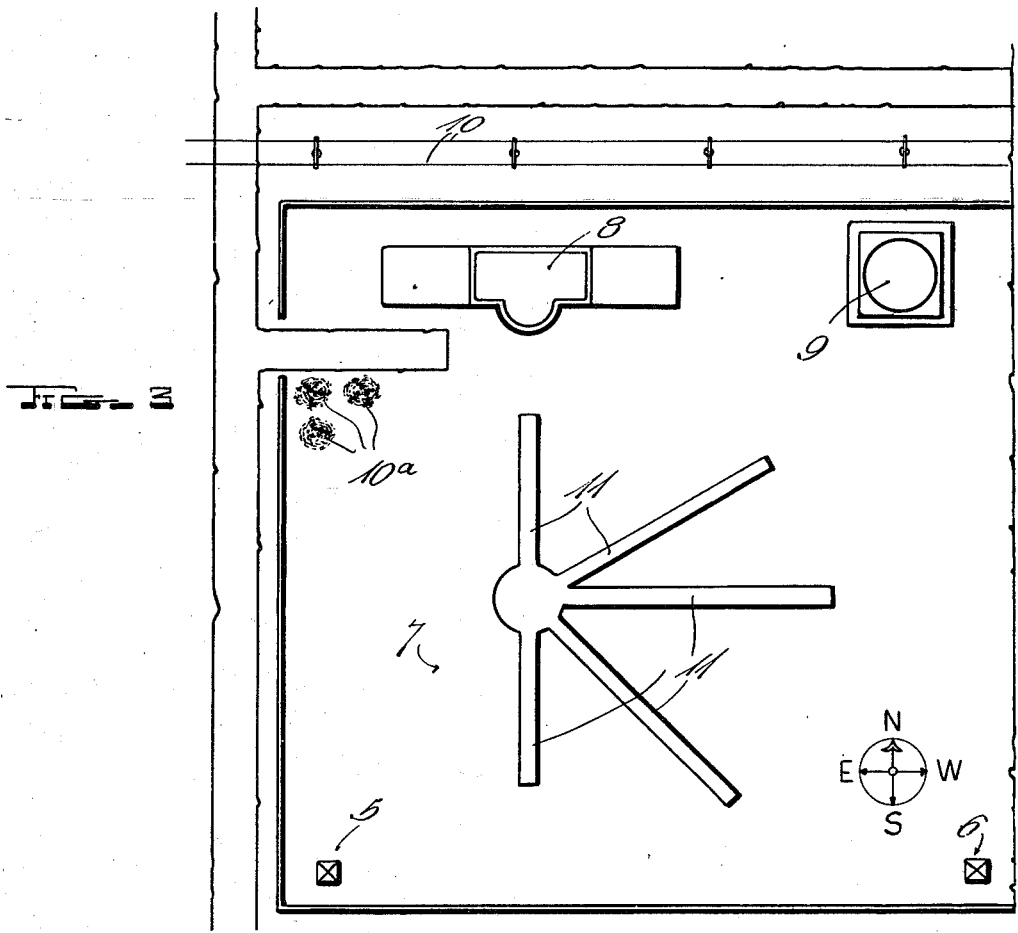
Figure 13:
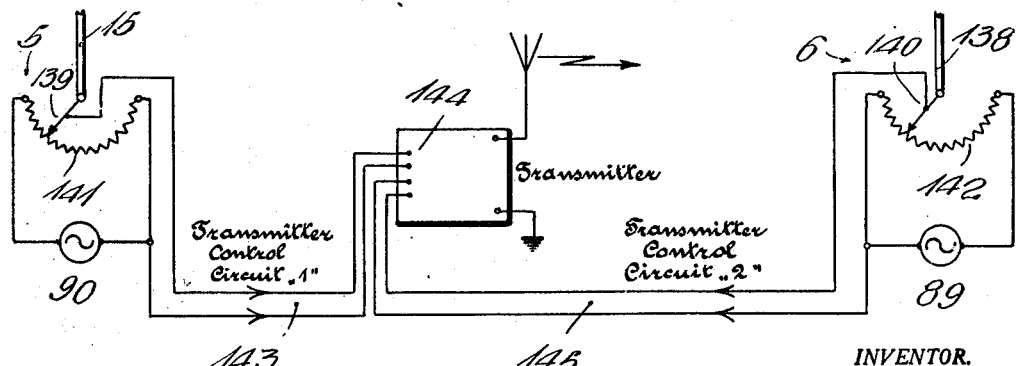

Other and further objects of my invention reside in a method of and apparatus for guiding mobile bodies to a designation according to a path which may be visually indicated to the pilot on the mobile body, all of which will be pointed out more fully in the specification hereinafter following by reference to the accompanying drawings, in which:

Figure 1 designates diagrammatically a transmitter circuit carried aboard aircraft for the transmission of signals according to a multiplicity of automatic receiving stations located at an airport or landing field; Fig. 2 diagrammatically shows an aircraft equipped with a transmitting antenna for radiating signals to the automatic receiving station at the airport or landing stations; Fig. 3 is a schematic view illustrating the landing field and obstacles surrounding the field which must be avoided by aircraft in effecting a landing; Fig. 4 is a schematic view showing the arrangement of the automatically rotatable loop antenna in each of the two automatic receiving stations which are located at remote positions of the landing field illustrated in Fig. 3; Fig. 5 is a theoretical view showing the relationship of the loop antenna; Fig. 6 diagrammatically shows the receiving circuits located at remote points on the landing field of Fig. 3; Fig. 7 shows the land line circuits which are employed in recording the operation of the automatic receiving stations for controlling the operation of a transmitter designated at the airport or landing field; Fig. 8 is a plan view of the coordinating means at the landing field by which the automatic receiving apparatus controls the operation of the transmitter at the landing field; Fig. 9 diagrammatically shows the transmitting circuit located at the landing field and the control channels by which the apparatus of Fig. 8 controls the transmission of signaling energy to the approaching aircraft; Fig. 10 diagrammatically illustrates the arrangement of receiving circuit aboard the aircraft and shows the arrangement of the mechanism which indicates the path of movement of the aircraft with respect to the airport or the landing field; Figs. 11 and 12 show cross-sectional and plan views respectively of one form of indicating apparatus which may be carried aboard the aircraft for indicating to the pilot the position of the aircraft with respect to the position of the landing field; and Fig. 13 shows a modified form of transmission control for the transmission of signaling energy from the landing field, directly controlled by the operation of the automatic receiving stations without the interposition of the land line circuits and control apparatus illustrated in Figs. 7 and 8.

My invention contemplates an indicator which may be carried aboard a navigable vessel and which will at all times inform the pilot as to the position of the vessel with respect to a port. I have illustrated my invention in connection with the navigation of aircraft but it will be understood that my invention is also applicable to the navigation of vessels at sea for automatically indicating to the pilot the direction of port and the position of the vessel with respect to the port. The circuits of my invention are so arranged that the course of travel of a vessel or aircraft to any port or landing field may be indicated.

In carrying out the principles of my invention, it is necessary that the ports or landing field be accurately surveyed and charted. The characteristics of each port or landing field must be accurately reproduced on a small size replica consisting of a plate insertable into a carrier mounted before the pilot. The replica of the port or landing field before the pilot shows all of the obstacles which must be avoided in bringing the vessel to port and indicates the safest course to be followed in bringing the vessel to port. A pilot in approaching a certain port or landing field must insert in the carrier before him the plate bearing in replica the characteristics and outline of that port or landing field. By the operation of the automatic circuits of my invention a tracing stylus or a spot of light appears on the chart designating the position of the navigable vessel with respect to parts of the port or landing field. Thereafter it is necessary for the pilot to navigate the vessel so that the stylus or spot moves in the course indicated on the chart as the safest course to be followed by the vessel in bringing the vessel to port. The coordination of the several circuits involved in the automatic system may be briefly summarized as including a transmitter carried aboard the navigable vessel which radiates energy non-directionally in all directions, which energy is picked up by receiving stations located at widely separated points with respect to the landing field or port. The receiving stations serve to automatically orient a pair of movable arms which intersect at a point which is relatively movable according to the direction of the incoming signaling energy picked up by each of the receiving stations from the aircraft. The movable arms change in position according to the change in position of the aircraft approaching the landing field. A pair of independent arms are also provided, intersecting at a point coincident with the point of intersection of the aforesaid movable arms. These last mentioned arms serve to control the movement of contactors over a pair of resistors in variable amounts according to the position of the transmitting aircraft. The resistors are located in separate tone control circuits of a transmitter which is erected adjacent the landing field, and as the resistors are variably controlled, different amounts of energy of particular tone frequency will be radiated from the transmitter on the same carrier frequency.

On the aircraft, I provide a receiving circuit adapted to receive the carrier frequency from the landing field, with separate tone channels responsive to the tone frequencies emitted from the transmitter. Each tone channel controls the angular movement of an electromagnetic member to which is secured a moving arm or plate pivoted in positions adjacent the replica of the landing field at points geographically corresponding to the position of the automatic receiving stations on the landing field. This arrangement enables the movable arms to be shifted to a position where the intersection thereof designates the position of the aircraft with respect to the parts of the landing field that the aircraft is approaching. In lieu of movable arms with a stylus at the end thereof for tracing the course of the aircraft I may employ movable sectors having radially disposed slots therein, the intersection of which provides a path for light which may be directed through the plate members upon the chart to indicate the position of the aircraft with respect to the parts of the landing field by means of a moving spot of light. In lieu of the system of movable arms for interlinking the automatic receiving stations with the transmitting station at the landing field, I may directly coordinate the automatic receiving stations with the tone frequency control means of the transmitter for variably emitting different quantities of modulated energy from the transmitter.

Referring to the drawings in more detail, reference character 1 designates the antenna carried upon aircraft as illustrated in Fig. 2, the antenna 1 being connected to a transmitter circuit including an oscillator 3 and a tuned circuit 4 connected to counterpoise 2 on the aircraft and adapted to emit carrier frequency which is picked up by the automatic receiving stations 5 and 6 located on the landing field 7 illustrated in Fig. 3. The automatic receiving stations 5 and 6 are very accurately located with respect to the parts of the landing field in such manner that a replica or chart of the landing field with pivotal points for a system of moving arms 5 located adjacent the replica or chart on the aircraft in precisely the same geographical positions as are occupied by the automatic receiving stations 5 and 6. On the landing field 7, I have indicated generally obstacles such as the hangar 8, the tank 9, the overhead telegraph, telephone and power lines 10, and trees 10a. The runways for the aircraft are designated at 11. All of these parts and other natural obstacles such as mountains adjacent the landing field must be reproduced in detail on the chart 12l which is mounted in carrier 121a before the pilot. Each automatic receiving station indicated at 5 and 6 comprising elements which have been shown schematically in Fig. 4 as including a vertically disposed rotatable shaft 15 journalled in a suitable frame structure 16, loop antenna 12 is disposed in one plane and loop antenna 14 disposed in a plane normal thereto. Leads are taken from loop 12 through suitable collector rings and brushes to the connections designated at 12a. Connections are taken from loop 14 through suitable collector rings and brushes to leads connected at 14a. The rotatable shaft 15 is provided with a gear 17 in the end thereof which is driven automatically by means of motor 18 to a position where the resultant 20 indicated in the diagram in Fig. 5, which is the bisector of the angle between loops 12 and 14, effectively extends in the direction of the approaching aircraft.

At each automatic receiving station I provide means for automatically orienting the loops as shown in detail in Fig. 6. The loop 12 connects to the radio frequency amplifier channel 40 illustrated at 21, the terminals 12a being connected to the input of the amplifier, the input circuit being permanently tuned to a selected frequency by means of condenser 23. The output of radio frequency amplifier 21 connects to the input circuit of detector 22 permanently tuned to the frequency transmitted from the aircraft by means of condenser 24. The loop 14 which is mounted upon rotatable shaft 15 is connected through leads 14a to the input of radio frequency amplifier channel 29, the input circuit of which is tuned to the same frequency as is the amplifier channel 21. The output circuit of amplifier channel 29 connects to detector 30, the input circuit of which is permanently tuned by means of condenser 32 to the frequency of the energy transmitted from the aircraft transmitter. The detectors 22 and 30 connect to a common power supply circuit and in the output circuits there are arranged separate audio frequency transformer systems 27 and 33. The transformer system 27 connects through tuned circuit 26 to the rectifier tube 25, the output circuit of which includes the winding 31 of relay 28. The transformer system 33 connects to tuned circuit 34 and to the input of rectifier tube 36, the output circuit of which connects through winding 37 of relay 28. Relay 28 includes a tongue 28a to which coil 37 is connected and contacts 28b and 28c with which tongue 28a connects according to whether or not the amplitude of the received signaling energy predominates either in loop 12 or loop 14. The contacts 28b and 28c control the circuit from a source of power 38 to electromagnets 39 or 40 so that these electromagnets are alternatively energized according to whether or not the signaling energy in loop circuit 12 exceeds the amplitude of the signaling energy in loop circuit 14 or vice versa. When the signaling energy in the two amplifier channels is equal, relay tongue 28a is balanced and contacts 28b and 28c are both open so that solenoids 39 and 40 are both deenergized, thereby opening sets of contacts 41 and 42 and deenergizing driving motor 18 by cutting off the supply of power from source 44 to field 43. Under this condition shaft 15 remains stationary. However, should the signaling energy in loop circuit 12 exceed the amplitude of the signaling energy in loop circuit 14, an unbalance will occur tending to remove relay tongue 28 and energizing one of the solenoid circuits and operating the motor 18 for moving the shaft 15 to a position where a balanced condition will be obtained. It will therefore be seen that depending upon the signal strength in either loop circuit 12 or loop circuit 14 motor 18 will be revolved in that direction which will tend to equalize the signaling energy in both loops 12 and 14 and when the signaling energy is thus equal the motor will automatically stop. Shaft 15 carries a contacting arm 47 which moves over the resistance 46. Leads 46a and 47a extend from the ends of resistance 46 and from the contact arm 47 respectively. These leads may extend a substantial distance by land line to a central position on the landing field as indicated in Fig. 7. The two automatic receiving stations at remote positions on the landing field have been reproduced diagrammatically at 5 and 6. The land wires which extend from each automatic receiving station connect to relay circuits indicated at 48 and 68. The leads 46a extend to the ends of a potentiometer 49. The leads 66a from the resistor 66 at the automatic receiving station 5 extend to the ends of the potentiometer 53. A central combining apparatus 54 is provided with a plane member on which movable arms 51 and 52 are pivotally mounted at 51a and 52a. Arm 51 has an extension contact 50 which moves over potentiometer 49. Arm 52 has an extension contact 13 which moves over potentiometer 53. The arm 51 with its extension contact 50 journaled at 51a is positively driven by means of motor 56. Field winding 57 of motor 56 is connected to source of potential 58 through switching relays 63—64 which are controlled by solenoids 59 and 60. Solenoids 59 and 60 are selectively energized from source of potential 61 through contact system 62c—62b of relay 48. When relay tongue 62a is moved to contact 62c, solenoid 59 is energized actuating motor 56 in one direction while under the condition where contact arm 62 moves to contact 62b, solenoid 60 is energized thereby closing contact 64 and reversing the direction of movement of motor 56. This operation is similar to the reversal of the armature and field connections of motor 18 at each of the automatic receiving stations. Battery 69 extends across the land line 46a and serves to energize relay winding 62 of relay 48. For every position of contactor arm 47 on potentiometer 46 there is a corresponding position for contactor arm 50 on potentiometer 49. It will therefore be apparent that movement of the automatic receiving station loops will bring about an angular displacement of contactor 47 and a corresponding displacement of contactor 50. Arm 51 which is connected to the contactor arm 50 will have a movement corresponding to the movement of contactor 50. The arrangement of the automatic receiving station 5 is identical with the arrangement of the automatic receiving station 6. That is, the resistor 66 connects to the ends of potentiometer 53 through leads 66a and across source of potential 70. The movable winding 72 connects between the contactor 13 and the contactor arm 67 through leads 67a in the same manner that winding 62 of relay 48 connects between contactor arm 47 on resistor 46 and contactor arm 50 on potentiometer 49 through lead 47a. The relay 68 has tongue 72a arranged to move with winding 72. Contacts 72b and 72c are arranged on opposite sides of the relay tongue 72a. Solenoids 79 and 80 connect with source of potential 71 through contacts 72b and 72c and contact tongue 72a. Solenoids 79 and 80 control sets of contacts 83 and 84 for effecting a reversal of movement of motor 76 by reversing the direction of the field 77 with respect to the armature 76 from the potential source 58. Motor 76 positively drives the contact arm 13 and angularly movable arm 52 about the pivot 52a as a center. When the automatic receiving station 5 shifts contactor arm 67 along resistor 66, a corresponding movement of contact arm 13 is brought about by operation of driving motor 76 under control of relays 68. It will be understood that relays 68 and 48 have normal mid-positions at which time the driving motors 56 and 76 are not in operation. Displacement of the contactor 47 or 67 by means of the automatic receiving stations effect an unbalance in the land line circuits, thereby causing relays 48 and 68 to shift to a position tending to restore a balance and bringing about the required operation of the motors 56 and 76 operating contactor arms 50 and 13 rendering portions of the potentiometers 49 and 53 effective in the landing line circuits of such order as will tend to restore a balance of the land line circuits thereby shifting relays 48 and 68 and bringing about the accompanying operation or stopping of motors 56 and 76. The movable arm 52 establishes sliding connection with movable arm 51 intersecting as indicated at 55. A consideration of the coordinated movement of the two automatic receiving stations will show that the point of intersection 55 varies according to the position of the transmitting aircraft with respect to the landing field. In order that this variable factor may be reproduced aboard the aircraft, a transmitting station located at the landing field is variably controlled according to the movement of the point of intersection at 55. This is brought about by an arrangement of angularly movable arms 85 and 86 pivoted at 85a and 86a and having contactor extensions 87 and 88 establishing connection with potentiometers 75 and 65 respectively.

In Fig. 9, I have shown in detail the arrangement of potentiometers 65 and 75 in the modulation circuits of the transmitter. The contactor arms 87 and 88 are illustrated in Fig. 9 as variably including selected portions of the potentiometers 65 and 75 in the modulation control circuit.

Fig. 8 will render the operation of the control means of my invention much clearer in that it will be seen that the angularly movable arms 51 and 52 are each longitudinally slotted as indicated at 51b and 52b so that as the angular relation of the arms vary under control of the positive driving connections with motors 56 and 76 respectively, the intersecting connection 55 may slide longitudinally along the angularly movable members 51 and 52. The transmitter control potentiometers 65 and 75 have their corresponding angularly movable arms 86 and 85 slotted at 86b and 85b respectively so that the point of intersection 55 will shift arms 86 and 85 in a similar manner for correspondingly varying the position of contactors 88 and 87 on potentiometers 65 and 75.

In the transmitter system illustrated in Fig. 9 separate tone channels are provided constituted by generators 89 and 90 developing the potentials $E_1$ and $E_2$ respectively. Across these generators the potentiometers 65 and 75 are shunted. Selected quantities of the energy from the tuned channels may be derived from potentiometers 65 and 75 by the movement of the contactors 88 and 87 under control of the angularly movable members 86 and 85 respectively. The separate tone channels are coupled to the oscillator 100 through independent amplifiers 92 and 94 and through common amplifier 98. The amplifier 92 is coupled to the tone frequency generator 89 through transformer 91 with tone filter 95 connected in circuit therewith for excluding all frequencies except that which is utilized for modulation of the transmitter. The amplifier 94 is coupled to the tone channel generator 90 through transformer 93 and tone filter 96 by which only the tone generated by tone channel generator 90 is rendered effective to modulate the transmitter; the two sound channels connected through transformer 97 with amplifier 98 to oscillator 100. The oscillator 100 is coupled to antenna 101 and ground 102 for the radiation of energy modulated according to two different tone frequencies. The apparatus on the aircraft which cooperates with the transmitting circuit of Fig. 9 is shown diagrammatically in Fig. 10, the antenna counterpoise system being illustrated at 103—104 connected to the input circuit 105 of the radio frequency amplification system including tubes 106, 107 and 108, the output of which connects to the detector tube 109, all of the circuits of the several amplifier stages and the detector stage being tuned through the unicontrol tuning arrangement 110. The output of the detector includes independent tone channels connected to tuned transformers 111 and 112, the secondary circuit of each transformer being tuned as represented at 114 and 115. The tone channel which connects to transformer 111 includes amplifier 113 with a frequency selector circuit 115 therein for excluding all frequencies except that tone frequency to which the tone channel is selective. The output of the amplifier 113 connects through transformer 116 to the rectifier circuit 117 to which there is connected the pivotally mounted winding 119 forming part of the electrodynamic system including field magnet 119a. The coil 119 connects through a filter circuit 118 between a mid-tap connection on a potentiometer 131 which bridges the cathode of rectifier tube 117 and the mid-tap connection 116a in the secondary winding of transformer 116. The cathode of rectifier tube 117 is heated from the source of potential which connects across potentiometer 131 and which is used for heating the cathodes of the other tubes in the receiving circuit. The movable coil 119 is pivoted at 120a and connects to the angularly movable arm 120 which is adapted to sweep over the replica or chart 121 which shows the various parts of the aircraft landing field.

The second tone channel includes transformer 112 tuned to one of the modulating tone frequencies, the secondary of the transformer being tuned by means of circuit 126 to respond to the second of the two modulating tone frequencies, the circuit 126 being connected to the input of the amplifier tube 125 to the filter 127 which excludes all tone frequencies except that tone frequency which is desired for operating the electrodynamic apparatus at the receiver. The output of amplifier 125 connects through transformer 128 with the circuit of rectifier tube 129. A filter circuit 130 connects between a midpoint in the cathode resistor 132 and a midpoint 128a in the secondary of the transformer 128, the output of the filter connecting to moving coil 124 of the electrodynamic device 124a. The coil 124 is pivoted at 123a and is secured to angularly movable arm 123 which intersects with arm 120 at the point 122. The point 122 may travel over the entire area of the chart or replica 121 indicating to the pilot the exact position of the aircraft with respect to the parts of landing field. The point 122 may be in the nature of a stylus for drawing a line on the chart 121 showing the course of the aircraft. In lieu of the stylus and angularly movable arms, I may pivotally mount sets of sectors 133 and 134 in positions behind the chart 121 as illustrated in Figs. 11 and 12. In this arrangement the pivotal mounting means illustrated at 120a and 123a are each located as are the correspondingly numbered means in Fig. 10 in such relation to the chart 121 that these pivot points bear the exact geographical relation to the parts of the landing field in replica as do the automatic receiving stations 5 and 6 on the landing field of Fig. 3.

In Figs. 11 and 12, the movable sectors 133 and 134 are slotted radially at 133a and 134a intersecting at 135 in such manner as to provide a path for light rays from the light source 136 directed by the reflector 137 to the rear of the chart 121. The chart 121 is removably carried in the holder 121a and is translucent in character so that the light spot at 135 will appear on the replica or chart and will move over the chart according to the movement of the members journalled at 120a and 123a. The precise geographical proportions with respect to the parts of the landing field and the positions of the journals 120a and 123a must be maintained for securing the required results.

In lieu of the coordination board 54 as shown in Fig. 7 on the landing field I may employ the direct control method illustrated in Fig. 13 wherein the automatic receiving stations illustrated at 5 and 6 have the rotatable shafts 15 and 138 directly connected to conductor arms 140 movable over resistors 141 and 142 where resistor 141 connects in shunt with tone frequency generator 90 while resistor 142 connects in shunt with tone frequency indicator 91. The effective potential from generator 90 is supplied over circuit 143 to control the transmitter 144. The effective potential from tone frequency generator 89 is supplied over circuit 145 to control transmitter 1. The amounts of energy supplied to the tone modulation circuits of the transmitter 144 are variably controlled in accordance with the movement of contacts 140 and 139 of the rotatable loop receiving stations for automatically controlling the transmission of energy to the approaching aircraft. The transmitted signaling energy is modulated at the two different audio notes obtained from generators 89 and 90 varying in amplitude according to the position of the contactors actuated by the automatic receiving stations.

In both the combining board line wire system of Fig. 7 and the direct control transmitting system of Fig. 13, I depend upon a plurally modulated carrier frequency where the carrier is modulated at different tone frequencies, the amplitude of intensity of each tone frequency varying continuously and correspondingly controlling the movement of the angularly movable members at the receiver for indicating the position of the aircraft and the course of approach thereof to the landing field. In all instances where I have mentioned the movement of the aircraft with respect to the landing field, it will be understood that the system is equally applicable in guiding ships into a harbor or port, where the moving stylus at the receiver or spot of light at the receiver indicates the location of the ship with respect to the harbor or port.

The system of my invention may be standardized so that each port or landing field may supply charts in replica to aircraft flying between cities of which the said landing field is one of the terminal points. By standardizing the geographical location of the pivoting points 85a and 86a with relation to each airport in the same compass position with respect to the parts in replica, all of the landing fields are coordinated in a standardized system, so that it is only necessary for the pilot to change the chart or replica as he approaches the particular landing field which the chart represents in order that the moving spot of light or stylus may guide him to a safe landing position on the field. The chart or replica of the landing field may be in the shape of an aerial photograph with all the obstacles represented, so that the pilot is fully informed regarding the character of the country surrounding the landing field and is warned of the dangers which may impair safe landing. The pivotal points of the "idler arms" 85a and 86a at the transmitting point, correspond to the position 120a and 123a at the receiving point on the aircraft. The position of the automatic receiving stations can be any suitable one, but of course, the appearance of the board represented by Fig. 8 would be modified according to each local condition. In other words, the position of the "idlers" in relation to the field similitude is always the same. The position of the motor driven arms may be at any convenient point.

If, however, the automatic receiving stations are situated in the geographical points represented by 85a and 86a, then, and only then, the disposition shown in Fig. 13 becomes possible.

The automatic operation of the receiving stations is such that it is unnecessary to provide an operator at the receiving stations 5 and 6. Power is supplied to the circuits of the receiver from suitable generators or from a power line system and except for a replacement of tubes, no other attention to the automatic receiving circuits is normally required. The loops in the automatic receiving stations automatically orient to a position where the resultant points toward the plane, thereby bringing about the required movement of the contactor arm on the associated potentiometer for either direct control of the plurally modulated transmitter or for the control of the balanced land line circuit and the actuation of the plurally modulated transmitter through the combining board on the landing field.

In the claims I have used the term "landing port" synonomously with the term "flying course" and I do not mean that the pilot actually lands at such position. My invention is equally applicable to the navigation of aircraft over a flying course wherein the pilot places different contour charts or replica maps of the flying course in the carrier before him by which the light spot or visual indicating device represents the safest flying course to the pilot. The entire flying course may be navigated by the system of my invention as a flying course may be erected by arranging a continuous chain of adjacent landing fields equipped with the system of my invention for indicating the safest course to the pilot. Nothing prevents the use of one of the directional receiving stations for several adjacent portions of the flying course.

While I have described my invention in certain preferred embodiments, I desire that it be understood that modifications may be made and that no limitations upon my invention are intended other than are imposed by the scope of the appended claims.

What I claim as new and desire to secure by Letters Patent of the United States is as follows:

1. In a system for indicating the path of movement of a vehicle, a combining board comprising in combination with a plane area, a pair of pivotally mounted arms adapted to angularly shift in intersecting relationship, independent means for driving each of said arms, a pair of pivotally mounted similarly arranged arms disposed in intersecting relation with respect to each other and with respect to the aforementioned pair of arms, an adjustable potentiometer controlled by each of said last mentioned pair of arms, and a common connection for all of said arms at the position of intersecting relationship thereof whereby angular movement imparted to said first mentioned pair of arms is similarly transferred to said second mentioned pair of arms.

2. In a system for indicating the movement of a mobile body, a combining board comprising in combination with a pair of pivotally mounted arms, each movable over the plane area in intersecting relationship, a potentiometer controlled by each of said arms, independent means for angularly driving each of said arms, a pair of similarly arranged pivoted arms, a potentiometer controlled by the movement of each of said arms, and means extending through the intersecting portions of all of said arms whereby said first mentioned pair of arms transmits movement to said second mentioned pair of arms.

3. In an apparatus for transmitting electrical energy in accordance with the movement of a mobile body, the combination of a pair of normally balanced bridge circuits, an angularly movable device operatively controlled by each of said normally balanced bridge circuits, an angularly movable arm driven by each of said angularly movable devices in intersecting relation, a pair of pivotally mounted arms extending in intersecting relationship overlapping the aforesaid arms, a potentiometer device controlled by each of said last mentioned arms, and common means interconnecting said arms in the intersecting positions thereof whereby angular movement imparted to said first mentioned arms is transferred to said second mentioned arms and the said potentiometers controlled according to the angular movement of said last mentioned pair of arms.

4. In a system for transmitting angular motion, a pair of normally balanced bridge circuits, an angularly movable device controlled by each of said normally balanced bridge circuits, a pivotally mounted angularly movable arm connected with each of said angularly movable devices, said arms being angularly movable in intersecting relation over a plane area and having means connected therewith for controlling the balanced relationship of said bridge circuits, a pair of similarly mounted pivoted arms arranged in intersecting relationship and overlapping the aforementioned arms, a potentiometer controlled by each of said last mentioned arms, and common means for maintaining all of said arms in intersecting relation continuously throughout the path of angular movement of all of said arms.

5. In a system for transmitting angular motion, a pair of bridge circuits, a relay controlled by each of said bridge circuits, a pair of angularly movable devices, circuits individual to each of said angularly movable devices controlled by the said relays for determining the direction of angular movement of said angularly movable devices, a pivotally mounted arm driven by each of said angularly movable devices in intersecting relationship one with the other, a pair of similarly arranged pivotally mounted arms extending in overlapping intersecting relationship with respect to said first mentioned arms, and a potentiometer device controllable by each of said last mentioned pair of arms.

6. In a system for transmitting angular motion, a pair of bridge circuits, a relay controlled by each of said bridge circuits, a pair of angularly movable devices, circuits individual to each of said angularly movable devices controlled by the said relays for determining the direction of angular movement of said angularly movable devices, a pivotally mounted arm driven by each of said angularly movable devices in intersecting relationship one with the other, a pair of similarly arranged pivotally mounted arms extending in overlapping intersecting relationship with respect to said first mentioned arms, and a variable impedance device controllable by each of said last mentioned arms.

7. In a system for transmitting angular motion, a pair of bridge circuits, a relay controlled by each of said bridge circuits, a pair of angularly movable devices, circuits individual to each of said angularly movable devices controlled by the said relays for determining the direction of angular movement of said angularly movable devices, a pivotally mounted arm driven by each of said angularly movable devices in intersecting relationship one with the other, a pair of similarly arranged pivotally mounted arms extending in overlapping intersecting relationship with respect to said first mentioned arms, balancing means in each of said bridge circuits controllable by the movement of said first mentioned arms, and variable impedance means correspondingly controllable by the movement of said last mentioned pair of arms.

8. In a system for transmitting angular motion, a pair of bridge circuits, a relay controlled by each of said bridge circuits, a pair of angularly movable devices, circuits individual to each of said angularly movable devices controlled by the said relays for determining the direction of angular movement of said angularly movable devices, a pivotally mounted arm driven by each of said angularly movable devices in intersecting relationship one with the other, a pair of similarly arranged pivotally mounted arms extending in overlapping intersecting relationship with respect to said first mentioned arms, balancing means disposed in each of said bridge circuits, means connected with said first mentioned arms for adjusting said balancing means, loop antennae adapted to be oriented to different angular positions for unbalancing each of said bridge circuits and controlling the movement of said angularly movable means for restoring the balance of said bridge circuits, and variable impedance means controlled by the movement of each of said last mentioned pair of arms.

9. In a system for transmitting angular motion, a pair of bridge circuits, a relay controlled by each of said bridge circuits, a pair of angularly movable devices, circuits individual to each of said angularly movable devices controlled by the said relays for determining the direction of angular movement of said angularly movable devices, a pivotally mounted arm driven by each of said angularly movable devices in intersecting relationship one with the other, a pair of similarly arranged pivotally mounted arms extending in overlapping intersecting relationship with respect to said first mentioned arms, loop antennae individual to each of said bridge circuits and adapted to control by the orientation thereof the balance of each of said bridge circuits, separate balancing means in each of said bridge circuits controlled by the movement of said first mentioned arms, and variable circuit controlling means operated by said last mentioned arms for transmitting angular motion imparted by said first mentioned arms through said second mentioned pair of arms.

MARCEL WALLACE.